Oct. 22, 1929.  T. C. WENTWORTH  1,732,391
MIXING MACHINE
Filed April 13, 1927  2 Sheets-Sheet 1

Inventor:
Thomas C. Wentworth
By [signature]
ATTORNEY

Oct. 22, 1929.                T. C. WENTWORTH                1,732,391
                               MIXING MACHINE
                         Filed April 13, 1927      2 Sheets-Sheet 2
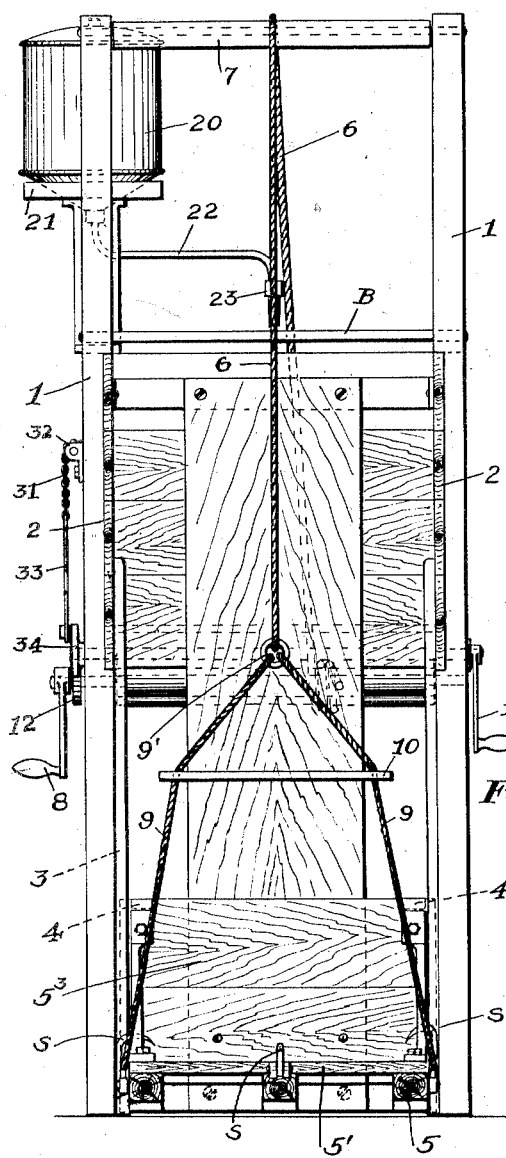
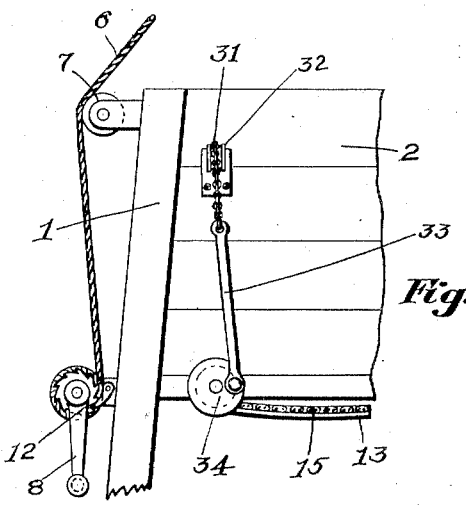
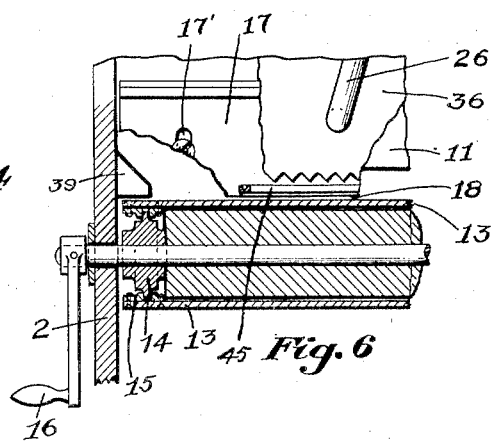
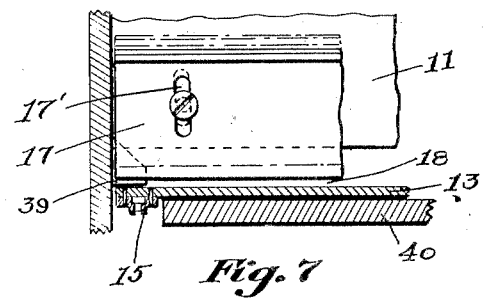
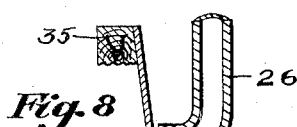
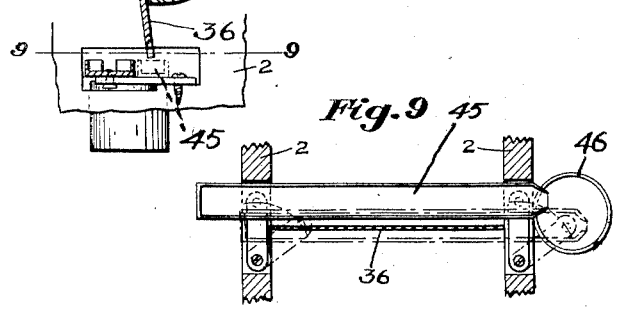
Inventor:
Thomas C. Wentworth
By
ATTORNEY.

Patented Oct. 22, 1929

1,732,391

UNITED STATES PATENT OFFICE

THOMAS C. WENTWORTH, OF CORNISH, MAINE

MIXING MACHINE

Application filed April 13, 1927. Serial No. 183,473.

The invention involved herein relates to an apparatus for distributing a fluid upon a mass of material to secure any desired treatment or impregnation of the material with the fluid. I will discuss my apparatus in connection with certain conditions and requirements with which it has been found to work satisfactorily.

The problem of augmenting certain elements required in a food in order that there may be present the proper amounts necessary in a well balanced diet furnishes a field in which my apparatus has proven of great use. Certain foods administered to animals or birds, such as cattle and poultry, not only tend properly to nourish the cattle and poultry but tend also to produce a more healthful milk from the cow or egg from the hen. Both milk and eggs are highly important items of human diet and the desirability of furnishing the cow and hen with proper and health-giving food has been recognized by physicians and scientists. It will be appreciated that if an egg can be produced which is high in a certain element required by the human body that egg is a more healthful food than one low in that element. The way to produce such eggs obviously is to feed food containing that element to the hen.

One of the present problems encountered is to administer to human beings a proper amount of vitamins. It is well known that cod liver oil has a high vitamin content, but it is very distasteful to and not easily assimilable by the average human being; therefore, it should, if possible, be administered through the food consumed by the human being rather than taken directly.

As illustrative of the use of my apparatus I provide for the treatment of ordinary stock and poultry feed with cod liver oil by means thereof. Without departing from the spirit of my invention, other substances than cod liver oil may be added as desired, and the material to be treated varied, but I shall refer to poultry feed and cod liver oil as illustrating my method and as being particularly adaptable to use in my machine. By a proper treatment of the feed with cod liver oil, a supply of vitamin can be put into the egg in amounts very much greater than that ordinarily present. Not only is gain in the desired content seen in the egg upon chemical analysis, but the poultry is also more healthful, vigorous, and attains greater growth.

In recent years the use of oil, particularly cod liver oil, has become quite general among farmers and others as a part of the ration for live stock, especially for poultry. The usual method in feeding the oil is to mix it by hand with the ordinary ration, which for poultry is commonly known as dry mash. This dry mash is principally a combination of various ground mill feeds. As the oil to be mixed with the dry mash is used in small proportions, it has been almost impossible in the past to distribute it through the feed with any degree of uniformity. An even mixture is essential in order for each bird to get its share.

Oil as recommended by nutrition experts and poultry authorities should not be mixed with the feed ration more than a few days in advance of using the feed as otherwise the high vitamin content of the cod liver oil may be lost by evaporation. This means that ordinarily the farmer or poultry man himself mixes the oil with the feed. The apparatus disclosed in my drawings will permit a thorough mixture of the feed and oil and greatly lessens the time required to do the work. My invention provides in addition to a uniform mixture of the oil with the feed, means for readily conveying and presenting the feed to the point where the oil is delivered thereto, and suitable means for delivering the oil to the feed.

In the drawings I have disclosed a form of apparatus which embodies my invention and is well adapted to practical use. Throughout specification and drawings I have employed like reference numerals.

In the drawings:

Fig. 4 is a rear elevation of the framework showing the feed elevating means and oil reservoir.

Fig. 5 is a detail of the eccentric and chain controlling the oscillatory movement of the oil distributor.

Fig. 6 is a section in the line 6—6 of Fig. 1, through the sprocket operating the endless conveyor, looking in the direction of the arrows.

Fig. 7 is a section on the line 7—7 of Fig. 2 showing the means for controlling the flow of feed from the hopper to the conveyor.

Fig. 8 is a detail of the oil delivery pipe and the distributing plate and Fig. 9 is a detail of the movable drip trough.

I have indicated at 1 the uprights of my machine and at 2 the walls which enclose the hopper, conveyor and oil distributing apparatus all to be hereinafter described.

Figure 1:
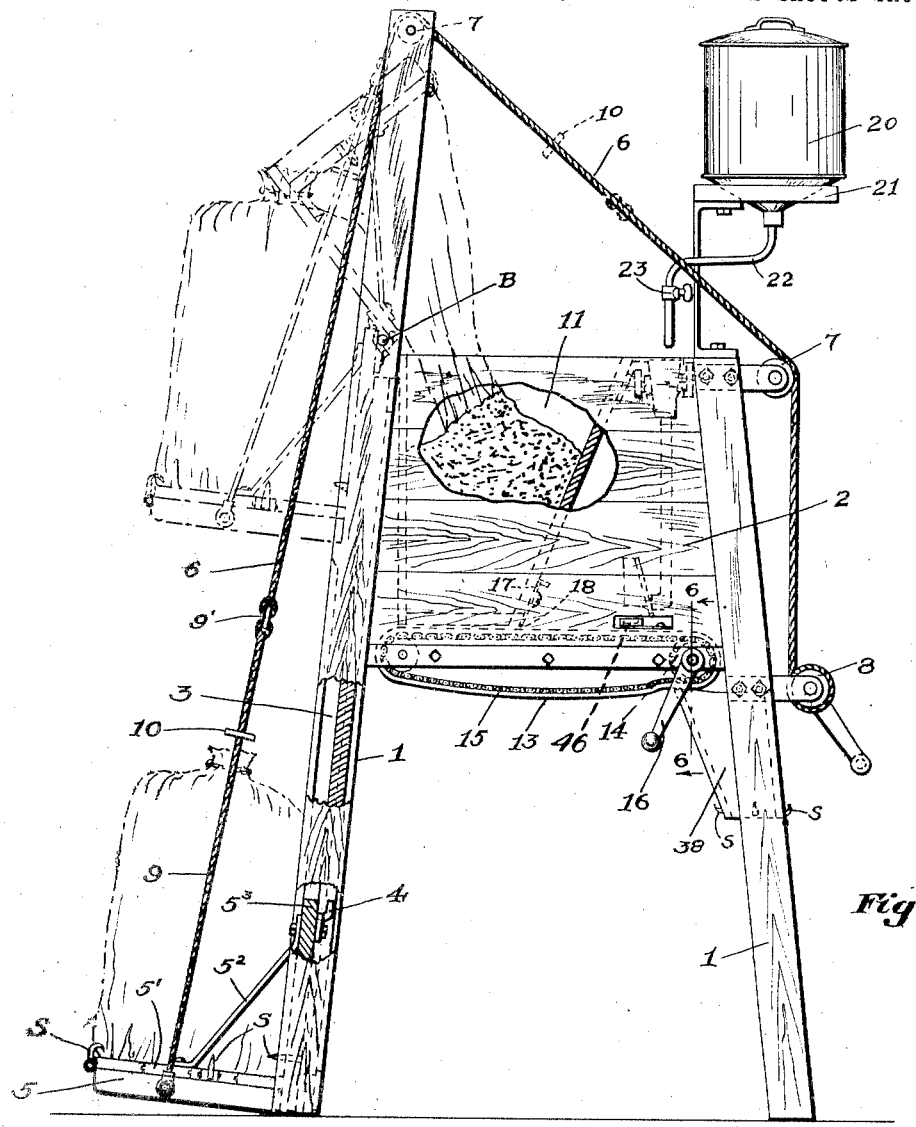
Fig. 1 is a side elevation of my mixing machine showing in dotted lines the means for conveying the feed to the hopper.

The rear uprights 1 are connected near their upper ends by a rod B, and are provided with slideways 3 in which slide the ends of the back boards 5³ of the grain elevator 5. This elevator 5 is fastened to and raised and lowered by a cable 6 running on guide rolls 7 and adapted to be wound and unwound on a windlass 8 which is erected on one of the front uprights (Fig. 1).

The grain elevator 5 comprises a platform 5', side braces 5² and a back 5³. The platform 5' is connected to the cable 6 by cords or ropes 9 which are joined by a hard-wood cross strip 10 provided with holes through which the cords 9 slip. These cords 9 are fastened to the end of the cable 6 by suitable rings 9' or otherwise. The distance between the platform 5' and the cross strip 10 is greater than the over all height of the bag of feed to be raised.

Attached to and carried by the back boards 5³ in the slideways 3 are hooks 4. When the platform 5' is raised by means of the cable 6 and windlass 8 these hooks are carried upward until they meet and partially encircle the bar B which connects the rear uprights 1 above the walls 2 which enclose the mixing area. When the hooks 4 so encircle the bar B the back boards have left the slideways 3 and the bag of grain has been raised to a point where it may be emptied into the hopper 11, as shown in dotted lines in Fig. 1. At this point the cable is locked by means of the pawl and ratchet 12 on the windlass 8 (Fig. 5). Sufficient force may now be applied to the platform 5' to cause the hooks 4' to swing on the bar B, carrying with them the entire elevator 5 and the bag of feed in place thereon, which is thus emptied into the hopper 11.

It will be noted that at various points on the elevator platform 5' I provide spurs S adapted to penetrate the material of the bag of grain and hold it firmly in position on the elevator 5.

Across the bottom of the enclosure surrounded by the walls 2 and beneath the hopper 11 I provide an endless conveyor 13 controlled by a sprocket 14 and chain 15. As shown in the drawings the sprocket is operated by a handle 16 on the shaft 16' although obviously force to operate the conveyor may be applied by other means.

At the bottom of the hopper 11 and just above the conveyor 13 I provide a feed delivery control gate 17. This gate is slotted at 17' through which slot is adjustably connected to the hopper wall 11 so that the thickness of the sheet of feed which is to be carried by the conveyor 13 from the bottom of the hopper 11 to the point where the oil is introduced may be predetermined. The feed escape passage 18 thus defined by the gate 17 and the conveyor 13 fixes the thickness of the sheet of feed on which oil is to be dripped as it passed beneath the oil apparatus later to be described.

I have shown at 40 (Figs. 2 and 7) a conveyor belt supporting member to maintain the belt in a constant position vertically with relation to the adjustable slide gate 17. This prevents any sag in the belt which would allow irregular thicknesses of feed to pass on the conveyor from beneath the hopper 11. I also provide a side strip 39 (Fig. 7) to hold the feed from displacement from and off the sides of the carrier belt.

Figures 2, 3:
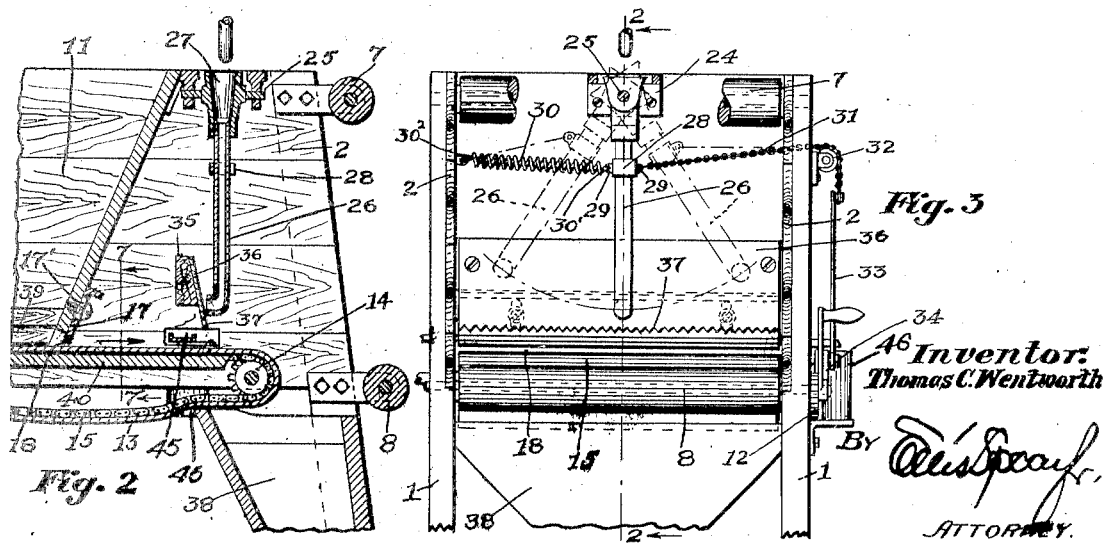
Fig. 2 is a section on the line 2—2 of Fig. 3, showing the oil distributing means.
Fig. 3 is a front elevation of the oil distributing means.

In Figs. 1 and 2 I have shown the belt and chain of the conveyor 13 in rubbing contact with the top of the delivery chute 38. By this means any possibility of feed clinging to the surface of the belt and passing beyond the delivery chute 38 to fall on to the floor is avoided.

My oiling apparatus comprises an oil reservoir 20 mounted on a suitable support 21 on one of the front uprights 1 of the framework. From this reservoir 20 leads a pipe 22 provided with a valve 23 to control the amount of oil which is delivered to the distributing apparatus.

To the side walls 2 just back of the front uprights 1 and in front of the hopper 11 I fasten by suitable means 24 a pivot 25 on which swings the oil discharge pipe 26. This discharge pipe 26 is provided at its pivot end with a suitable funnel 27 into which is fed a stream of oil as permitted by the valve 23. Below its pivot point 25 the discharge pipe 26 is encircled by a band 28 having ears 29. To one of these ears 29 is affixed one end 30' of a spring 30, which spring at its other end 30² is fastened to the wall 2. To the other ear 29 is fastened one end of a chain 31 which extends through the wall 2 over a roller 32 below which it is fastened at its other end to the arm 33 which is fixed to a crank disk 34 on the shaft 16' on which the operating crank 16 for the conveyor 11 is placed. On every revolution of the shaft 16' the discharge pipe 26 is pulled toward that side of the framework on which the crank 16 and crank disc 34 are mounted. This motion is resisted by a coil spring 30 which automatically returns the discharge pipe 26 to original position at each revolution of the crank disc 34. It will thus be seen that as the handle of the sprocket 14 is turned, the oil discharge pipe 26 swings back and forth on its pivot 25 over the endless conveyor 13. As the endless conveyor 13 is also operated by the crank 16 and shaft 16' the oil discharge pipe 26 moves in timed relation to the advance of the conveyor 13.

Transversely of the oil discharge pipe 26 and fastened at either side of the walls 2 by suitable means 35 is a distributor plate 36 of metal or other suitable material. This plate is provided with a serrated edge 37 extending entirely across the path of the conveyor 13. This plate 36 is fastened on an incline to the vertical and the lower edge of the delivery end of the discharge pipe 26 contacts the plate 36, there being a sufficient opening between the upper edge of the end of the pipe 26 and the plate 36 to allow oil to flow over the plate. By having the plate on an incline any possibility of oil dripping directly from the pipe to the feed is avoided.

As the delivery pipe 26 swings on its pivot 25, as shown in Fig. 3, it delivers a uniform flow of oil over the surface of the distributing plate 36. The oil flows over the plate 36 to the serrations 37 from which it drips evenly on to the feed carried by the endless conveyor 13.

Between the serrated plate 36 and the conveyor belt 13, I provide a movable drip trough 45, (Fig. 9). This trough extends through holes in the side walls and its purpose is to receive and carry away to a drip pan 46 any surplus oil which might drip from the distributing plate 36 when the conveyor operating crank 34 is at rest. One end of the trough is closed and extends through the wall 2 and the other end leads to the drip pan 46. Adjustment of the trough is effected by pushing in or pulling out in the closed end. The trough is pulled out when the oil is to drip in the feed and pushed in to catch the surplus oil remaining in the plate after all the feed has passed in the conveyor.

It will be noted in Fig. 1, that on the front uprights 1, I provide standards for supporting a suitable receptacle into which oil treated feed is delivered from the end of the conveyor 13. This standard 38 is also provided with spurs S adapted to contact with the receptacle and hold it securely in position.

My device is operated in accordance with the following method:

Feed is carried upward by the elevator 5, windlass 8, and cable 6 and dumped into the hopper 11. The feed delivery gate 17 is then adjusted as desired. The handle 16 on the endless conveyor is then turned and the endless conveyor 13 moving under the hopper 11 carries through the gate 17 a sheet of feed of predetermined thickness. The valve 23 in the oil pipe 22 has meantime been adjusted, and as the sprocket 14 controlling the endless conveyor 13 rotates, the eccentric 34 mounted thereon is operated and the pull conveyed by the eccentric causes the discharge pipe 26 to move back and forth across the face of the distributing plate 36. Oil is thus distributed over the plate 36 and quickly flows to the serrated edge from which it drips on to the feed travelling on the conveyor. By this method I secure a uniform distribution of the oil to all particles of the sheet of feed on the conveyor and this feed is delivered to the receptacles without any necessity for further mixing. The sheet of feed is of such thickness that the oil will quickly penetrate all the particles thereof. The amount of oil delivered may be controlled by the valve 23 and the amount of feed and the thickness of the sheet carried beneath the oiler may be varied according to the mixture desired. While I have referred to the application of oil to cattle or chicken feed as a specific use of my machine, it will be understood that such use is illustrative only as representing a particular field in which my machine has proven to be well adapted.

Various modifications in the construction of the framework and elevator and the means and method of delivering the feed to the hopper may be varied. Other means for carrying the feed from the hopper may be substituted for the conveyor disclosed in the drawings, and the means of operating the same may be varied. It is apparent also that other oil distributing apparatus may be provided all modifications being within the spirit of my invention if within the limits of the appended claims.

What I therefore claim and desire to secure by Letters Patent is:

1. In a mixing machine in combination, a conveyor and a fluid delivery comprising a distributor plate and a discharge pipe contacting with said distributor plate and discharging fluid thereon, means for operating said conveyor, and means for moving said discharge pipe past the face of said distributor plate.

2. In a mixing machine in combination, a conveyor and a fluid delivery comprising a distributor plate and a discharge pipe having its lower edge contacting with said distributor plate and discharging fluid thereon, means for operating said conveyor, and means for moving said discharge pipe past the face of said distributor plate in timed relation to the speed of the conveyor.

3. In a mixing machine in combination, a conveyor and a regulatable fluid delivery comprising a distributor plate fixed at an incline transversely of said conveyor and a discharge pipe having its lower edge in contact with said distributor plate and discharging fluid thereon, means for operating said conveyor, and means operated from said conveyor operating means and moving said discharge pipe past the face of said distributor plate in timed relation to the speed of the conveyor.

4. In a mixing machine in combination, a reservoir and a serrated distributor plate beneath said reservoir, a delivery pipe with its discharge opening adjacent said blade, and means for swinging said pipe longitudinally of said distributing blade, whereby the content of said reservoir is spread along said blade and is allowed to drip from the serrated edge thereof.

5. In a mixing machine in combination, a reservoir, a serrated distributor plate fixed at an incline beneath said reservoir, a delivery pipe connecting said reservoir with said distributor plate with its discharge opening adjacent said plate and means for swinging said pipe longitudinally of said distributing blade, whereby the content of said reservoir is spread along said blade and is allowed to drip from said serrated edge thereof.

6. Means for moving a pivoted discharge pipe in a predetermined path, comprising a support, a band encircling said discharge pipe, a spring connecting said band at one side to said support, an eccentric connected to said band at the other side, and a power shaft carrying said eccentric and effective on each revolution to swing said pipe back and forth on its pivot.

7. In a mixing machine in combination, a support, a fluid reservoir, a distributor plate, a fluid delivery pipe pivotally connected to said support with its discharge opening adjacent said distributor plate, means for swinging said delivery pipe on its pivot comprising a band encircling said delivery pipe, a spring connected at one side to said band, an eccentric connected to said band, at its other side, an external power shaft carrying said eccentric and effective on each revolution to swing said pipe back and forth longitudinally of said distributor plate.

8. In a machine of the class described, a hopper and a reservoir, an endless conveyor passing beneath said hopper and said reservoir, an adjustable gate on said hopper to control the thickness of the sheet of content carried from beneath the hopper by said conveyor, means for operating said conveyor, means for distributing the content of said reservoir comprising a pipe pivoted to the framework of the machine transversely of said conveyor and means for swinging said pipe on its pivot above said conveyor to deliver the content of said reservoir onto said conveyor.

9. In a machine of the class described, a feed hopper and an oil reservoir, an endless conveyor carrying material from said hopper to said reservoir, an adjustable gate on said hopper to control the thickness of the sheet of feed carried from the hopper by said conveyor means for operating said conveyor, oil distributing means comprising a serrated blade, a pipe leading from said reservoir to a point adjacent said blade and means controlled by said conveyor operating means for oscillating said pipe longitudinally of said blade, so that oil will flow thereover to said serrations whence it drips on the food on the conveyor.

10. In a mixing machine in combination, a reservoir and a distributor plate, a delivery pipe from said reservoir with its discharge opening contacting said plate and discharging fluid thereon and means for swinging said pipe longitudinally of said distributing plate, whereby the content of said reservoir is spread along said plate whence it drips under the force of gravity.

11. In a machine of the class described, a conveyor, a feed source adapted to deliver feed to said conveyor and a fluid source, means adapted to deliver fluid to said feed on said conveyor comprising a distributor plate and a discharge pipe from said fluid source adapted to deliver fluid to said distributor plate whence it drips to said feed on said conveyor.

In testimony whereof I affix my signature.

THOMAS C. WENTWORTH.